(12) United States Patent
Tewari et al.

(10) Patent No.: US 9,186,963 B2
(45) Date of Patent: Nov. 17, 2015

(54) METHOD FOR REDUCING GLARE FROM LIGHT SOURCES THROUGH WINDSCREENS WITH INTENSITY CONTROL FILM

(71) Applicant: GM GLOBAL TECHNOLOGY OPERATIONS, INC., Detroit, MI (US)

(72) Inventors: Asim Tewari, Karnataka (IN); Rohit Gupta, Karnataka (IN); Chandra S. Namuduri, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/153,382

(22) Filed: Jan. 13, 2014

(65) Prior Publication Data

US 2014/0153076 A1  Jun. 5, 2014

Related U.S. Application Data

(62) Division of application No. 12/951,275, filed on Nov. 22, 2010, now abandoned.

(51) Int. Cl.
| | |
|---|---|
| *G01J 1/32* | (2006.01) |
| *G06M 7/00* | (2006.01) |
| *H01J 3/14* | (2006.01) |
| *B60J 3/04* | (2006.01) |
| *G02B 26/02* | (2006.01) |
| *B60J 3/02* | (2006.01) |
| *B60J 3/00* | (2006.01) |
| *B60R 1/00* | (2006.01) |

(52) U.S. Cl.
CPC .... *B60J 3/04* (2013.01); *B60J 3/00* (2013.01); *B60J 3/02* (2013.01); *B60R 1/00* (2013.01); *G02B 26/02* (2013.01); *Y02T 10/88* (2013.01)

(58) Field of Classification Search
CPC .......... G02B 26/02; B60R 1/00; B60R 1/001; B60J 1/008
USPC ................ 340/901–904, 933, 937, 942, 988, 340/426.23, 426.24, 426.25, 441, 463, 468, 340/469, 600; 250/208.1, 208.2, 216, 205; 359/227, 229, 230, 237–324
See application file for complete search history.

(56) References Cited

U.S. PATENT DOCUMENTS

| | | | | |
|---|---|---|---|---|
| 4,818,011 | A * | 4/1989 | Cherian | 296/97.2 |
| 6,646,801 | B1 * | 11/2003 | Sley | 359/488.01 |
| 2003/0169213 | A1 * | 9/2003 | Spero | 345/7 |
| 2006/0215076 | A1 * | 9/2006 | Karim | 349/86 |
| 2006/0285207 | A1 * | 12/2006 | Hay | 359/493 |
| 2010/0165099 | A1 * | 7/2010 | Marchthaler et al. | 348/135 |

* cited by examiner

*Primary Examiner* — Pascal M Bui Pho
(74) *Attorney, Agent, or Firm* — Quinn Law Group, PLLC

(57) ABSTRACT

A method of reducing glare may include sensing a first light source with a second vehicle, and sensing a second light source with a first vehicle and oscillating a first light source ICF between a substantially opaque state and a substantially clear state on a first schedule. A second windscreen ICF may be oscillating between the substantially opaque state and the substantially clear state on a second schedule different from the first schedule. A position of the light source may be sensed and an eye position of the occupant estimated. An intersecting region of the selectively-darkenable ICF, which is located substantially along a line from the position of the light source to the eye position, is calculated. The intersecting region of the ICF is darkened, such that a reduced amount of light from the light source passes through the intersecting region.

7 Claims, 4 Drawing Sheets

METHOD FOR REDUCING GLARE FROM LIGHT SOURCES THROUGH WINDSCREENS WITH INTENSITY CONTROL FILM

CROSS-REFERENCE TO RELATED APPLICATIONS

This application is a divisional of application Ser. No. 12/951,275, filed Nov. 22, 2010, which is hereby incorporated by reference in its entirety.

TECHNICAL FIELD

This disclosure relates to reducing glare between light sources and vehicles or vehicle occupants using intensity control films.

BACKGROUND

Many vehicles include one or more headlamps (also referred to as headlights) usually attached to the front of the vehicle. Headlamps usually have the purpose of illuminating the road ahead during periods of low visibility, such as darkness or precipitation, but also serve to alert or signal the location of the vehicle to other vehicles and pedestrians.

When two or more vehicles approach each other, their respective headlamps may cause glare to the driver of the opposing vehicle. Headlamps are often configured to operate with more than one level of brightness or intensity, often referred to as low beams and high beams. Operation of the vehicle with high beams may increase glare to the driver of the oncoming vehicle.

Other sources of light may also cause glare to the driver of the vehicle. For example, and without limitation, road-side signage may incorporate bright lights projecting onto the roadway, spot lights may be used for numerous purposes on or near roadways, or the sun may be positioned in the view of drivers—especially during early morning or late afternoon driving.

SUMMARY

A method for reducing glare is provided. The glare may occur between a first vehicle and a second vehicle or between a light source and an occupant's eye. The first vehicle has a first light source with a first light source intensity control film (ICF) and a first windscreen with a first windscreen ICF, and the second vehicle has a second light source with a second light source ICF and a second windscreen with a second windscreen ICF. Each respective ICF is selectively changeable between a substantially opaque state and a substantially clear state.

The method may include: sensing the first light source with the second vehicle, and sensing the second light source with the first vehicle; oscillating the first light source ICF between the substantially opaque state and the substantially clear state on a first schedule; and oscillating the second windscreen ICF between the substantially opaque state and the substantially clear state on a second schedule different from the first schedule.

The method may also include sensing a position of the light source and estimating an eye position of the occupant. An intersecting region of the selectively-darkenable ICF is calculated. The intersecting region being located substantially along a line from the position of the light source to the estimated eye position. The intersecting region of the ICF is then darkened, such that a reduced amount of light from the light source passes through the intersecting region. Instead of estimating the eye position of the occupant, the method may include sensing the eye position of the occupant, and calculating the intersecting region of the windscreen based upon the sensed eye position.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
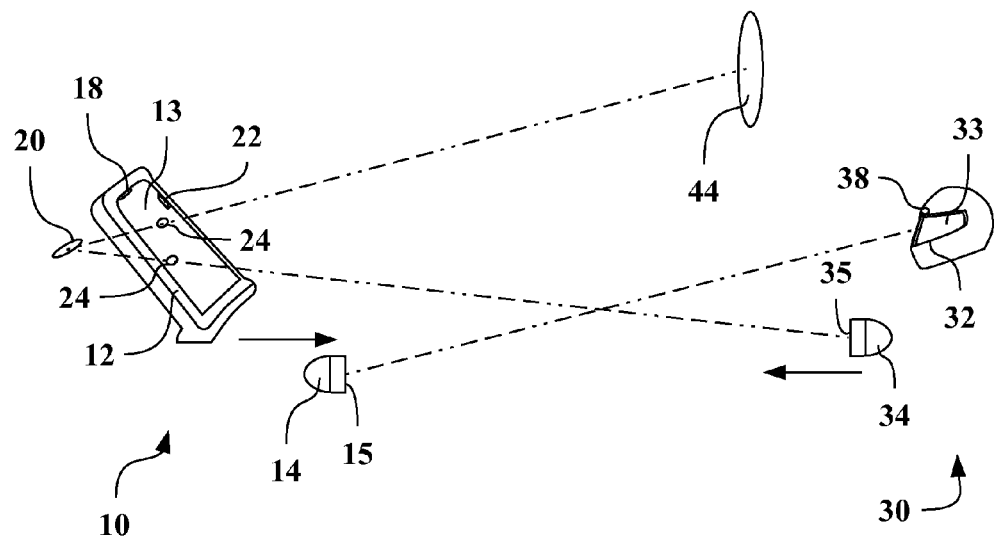
FIG. 1 is a schematic diagram of anti-glare systems for two vehicles.

Referring to the drawings, wherein like reference numbers correspond to like or similar components throughout the several figures, there is shown in FIG. 1 a schematic diagram of two anti-glare systems. The diagram shown in FIG. 1 is highly schematic and many elements of the system may have been omitted in order to clarify the diagram. A first anti-glare system 10 for a first vehicle (not separately shown) is represented on the left side of FIG. 1. The first vehicle may be a sedan, a convertible, an SUV, a pickup truck, a motor cycle, or any other vehicle. The first anti-glare system 10 includes a first windscreen 12, which may be a glass windshield, a plastic windscreen for motorcycles, a helmet visor, eye glasses, or other components through which the driver or occupants of the first vehicle view light.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The first windscreen 12 includes a selectively-darkenable intensity control film (ICF), which may be referred to as a first windscreen ICF 13. Generally intensity control films are thin substances which may be attached to transparent objects (such as the first windscreen 12) and may be controlled to selectively, and variably, adjust the amount of light which is able to pass through the ICF and the transparent object. The first windscreen ICF 13 covers much of the first windscreen 12. By controlling either a voltage across the first windscreen ICF 13 or a current which passes through the first windscreen ICF 13, a controller (not separately shown) may change the first windscreen ICF 13 from substantially transparent to substantially opaque, or may levels of opacity therebetween.

The first anti-glare system 10 also includes a first light source 14, which may be a headlamp, headlight, spot light, or other source of projecting light. The first light source 14 is also covered with a first light source ICF 15, which may be selectively darkened to prevent escape of light (especially bright light) from the first light source 14.

A first light sensor 18 is configured to sense the existence of oncoming light sources and may also sense the intensity of light sources. The first light sensor 18 is shown mounted on the first windscreen 12, but the first light sensor 18 may be mounted elsewhere. The first light sensor 18 may also be integrated with the controller (not separately shown) to process signals from the first light sensor 18 and control the first windscreen ICF 13. Sensing the light source may also include sensing a light source position.

In FIG. 1, an eye position 20 is a schematic representation of the location of an occupant's eyes—such as the driver of the vehicle. An eye position sensor 22 is configured to determine the eye position 20 and signal the controller. Alternatively, the eye position 20 may be estimated, instead of sensed by the eye position sensor 22. For example, and without limitation, the eye position 20 may be estimated based upon known characteristics (such as height) or biometric data of the driver or drivers, average population characteristics, the position of an adjustable head rest, or sensors located within the vehicle seat, seat back, or headrest.

Once the eye position 20 and the position of an oncoming light source, such as a third light source 44, are both known, an intersecting region 24 can be determined. The third light source 44 may be a non-vehicular source, such as, and without limitation: a bright road-side light, sign, or billboard; a spot light; or the sun. The intersecting region 24 is located substantially along a line from the third light source 44 position to the estimated eye position 20

The first windscreen ICF 13 may include a matrix of ICF cells (not shown in FIG. 1, but shown and described in as ICF cells 526 in FIG. 5), each of which may be selectively controlled. Therefore, portions or regions of the first windscreen ICF 13 may be made opaque while other regions remain transparent.

A second anti-glare system 30 for a second vehicle (not separately shown) is represented on the right side of FIG. 1, and may be a motorcycle or any other vehicle. The second anti-glare system 30 includes a second windscreen 32, which may be a helmet visor. The second windscreen 32 is covered with a second windscreen ICF 33, which is in communication with a controller (not shown) configured to selectively change the second windscreen ICF 33 between transparent, opaque, and semi-opaque states.

The second anti-glare system 30 also includes a second light source 34, this light source may be the headlight or headlights of the second vehicle. As shown in FIG. 1, the second light source 34 projects light toward the first vehicle and the first light source 14 projects light toward the second vehicle. The second light source 34 is also covered with a second light source ICF 35, which is controllable to selectively (and possibly variably) prevent escape of light (especially bright light) from the second light source 34.

A second light sensor 38 is shown mounted near the second windscreen 32, but may be located else where on the second vehicle. The second light sensor 38 may also be integrated with the controller (not separately shown) to process signals from the second light sensor 38 and to control the second windscreen ICF 33.

Figure 2:
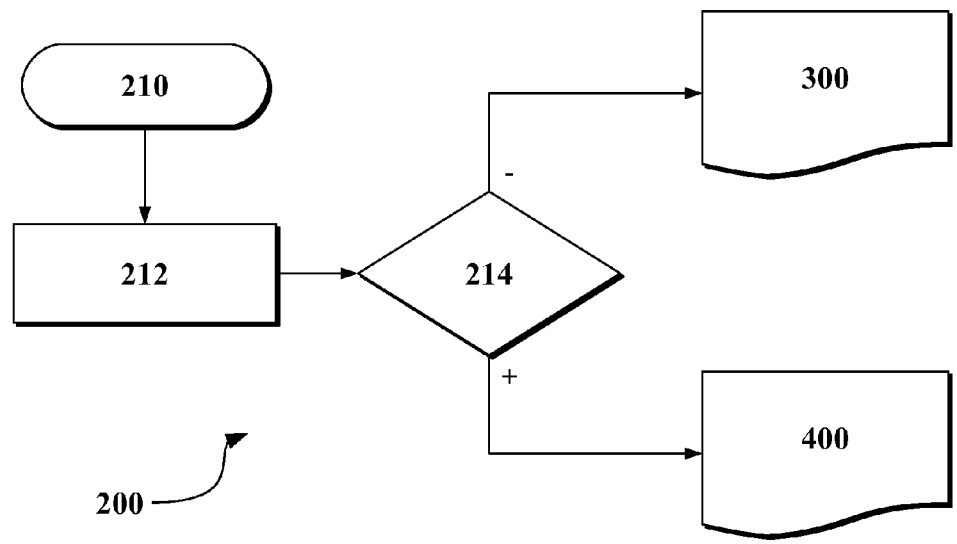
FIG. 2 is a schematic flow chart of an algorithm or method for reducing glare from light sources.
Figure 3:
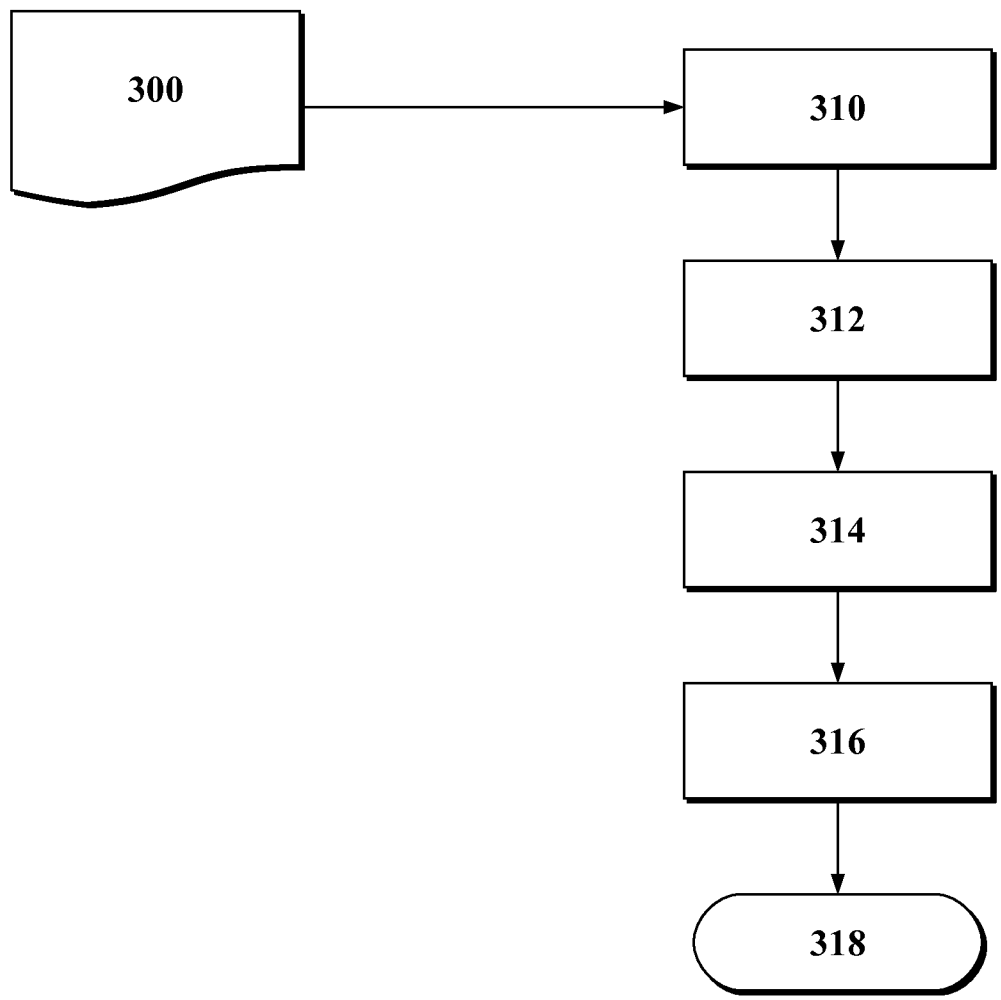
FIG. 3 is a schematic flow chart of a subroutine of the method shown in FIG. 2.
Figure 4:
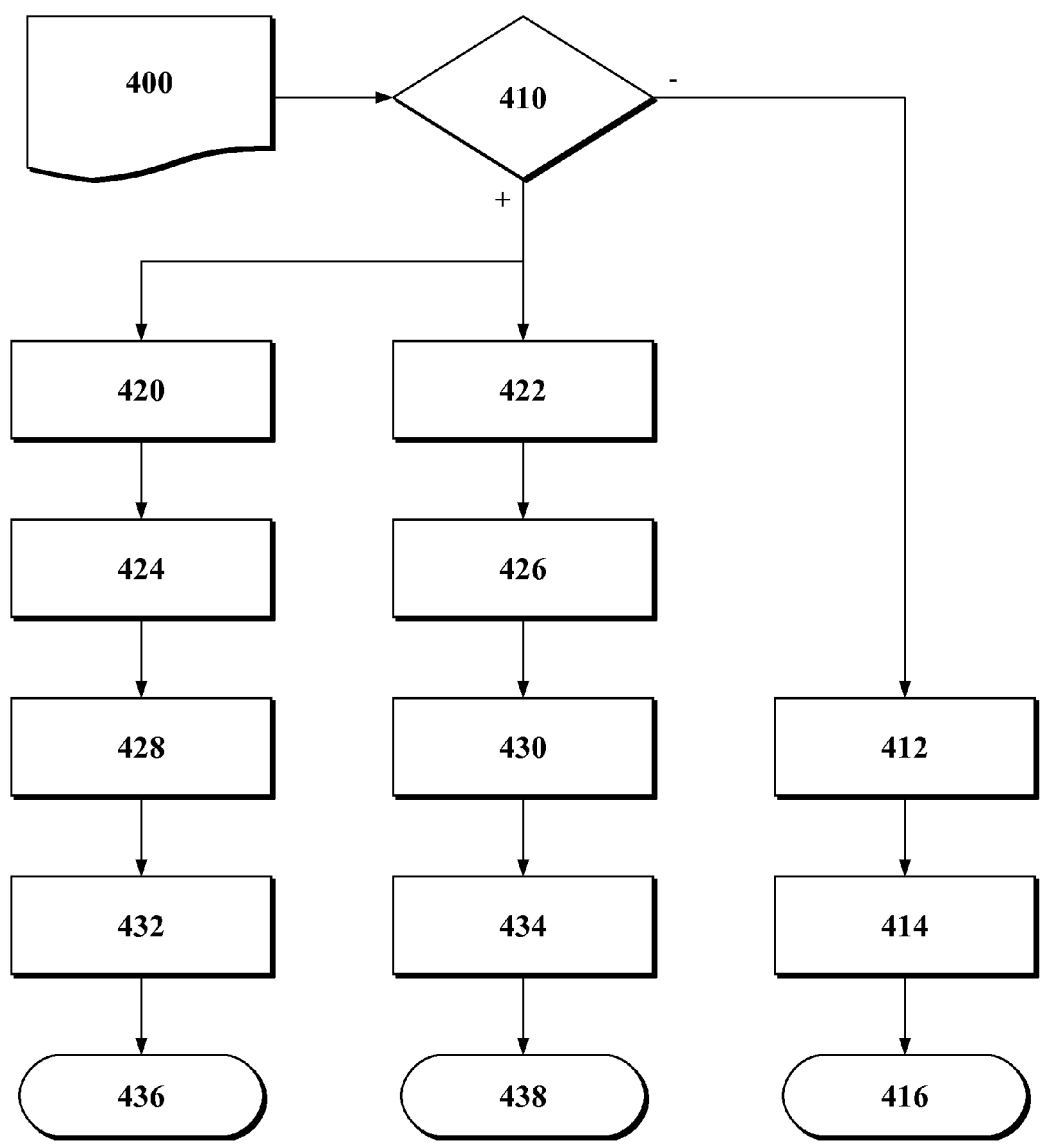
FIG. 4 is a schematic flow chart of another subroutine of the method shown in FIG. 2.

Referring now to FIGS. 2-4, and with continued reference to FIG. 1, there is shown a schematic flow chart of an algorithm or method 200 for reducing glare through a windscreen (such as the first windscreen 12) of a vehicle (such as the first vehicle) from a light source (such as the third light source 44) to an occupant. The method 200 utilizes windscreens covered with a selectively-darkenable ICF (such as the first windscreen ICF 13). FIG. 3 shows a subroutine 300 of the method 200, and FIG. 4 shows a subroutine 400 of the method 200.

For illustrative purposes, much of the method 200 may be described with reference to many of the elements and components shown and described in relation to FIG. 1. However, other components may be used to practice the method 200 and the invention defined in the appended claims. The exact order of the steps of the algorithm or method 200 shown in FIGS. 2-4 is not required. Steps may be reordered, steps may be omitted, and additional steps may be included. As viewed in FIG. 2, decision steps answered positively (as a yes) follow the path labeled with a "+" sign (the mathematical plus or addition operator). Similarly, decision steps answered negatively (as a no) follow the path labeled with a "−" sign (the mathematical minus or subtraction operator).

Step 210: Sense Light Source(s).

The method 200 begins as the first light sensor 18 senses a light source, such as the third light source 44. The first light sensor 18 may be operating continually, such that any time a sufficient light source is sensed the method 200 may be initiated.

Step 212: Sense Intensity.

In order to determine whether or not the anti-glare system needs to be implemented, the method 200 may sense the intensity of the third light source 44. This functionality may be incorporated into the first light sensor 18, such that only lights of sufficient intensity (or brightness) will be registered by the first light sensor 18 and trigger the method 200. Sensing the intensity of the potential source of glare may include factoring in ambient light conditions. For example, and without limitation, headlights of the oncoming vehicle may not be registered by the first light sensor 18 during bright daylight but may be sufficiently intense to start the method 200 during the evening or nighttime, or when weather conditions cause low ambient light conditions.

The method 200 may be occurring on either or both of the first vehicle and the second vehicle. The method 200 is described largely in relation to the first anti-glare system 10 of the first vehicle, but execution of the method 200 on the second anti-glare system 30 of the second vehicle may be very similar, depending upon the components with which each vehicle is equipped.

Step 214: Another Equipped Vehicle?

The method 200 then determines whether the oncoming light source is from another vehicle which is equipped with a similar anti-glare system. In FIG. 1, this may include determining whether the sensed light source is from the second vehicle (the second light source 34) or is an extraneous source, such as the third light source 44. If the oncoming light source is from another equipped vehicle, the two vehicles may cooperate in reducing the glare from each other's light sources. However, if the oncoming light source is not from an equipped vehicle, then the first anti-glare system 10 will have to reduce glare with its own components.

If step 214 determines that the sensed light source is not emanating from another equipped vehicle, the method 200 proceeds to a subroutine 300, the intersecting region subroutine. If the step 214 determines that the sensed light source is emanating from another equipped vehicle (such as the second vehicle having the second anti-glare system 30), the method 200 proceeds to a subroutine 400, the switching system subroutine. Either of the subroutines 300 or 400 may be implemented as independent algorithms, separate from each other and separate from the remainder of the method 200.

Subroutine 300: Intersecting Region Subroutine.

Generally, the intersecting region subroutine 300 looks to create a small region of opacity with the first windscreen ICF 13 on the first windscreen 12. Therefore, the source of glare—either the third light source 44 or the second light source 34—may be blocked without blocking the whole range of the driver's vision. The subroutine 300 may be used to reduce glare to the eyes of the driver, to other occupants of the vehicle, or to both. For illustrative purposes, the subroutine 300 is described in relation to reducing glare from the third light source 44, which may be the sun or a bright spot light located in the driver's field of vision through the first windscreen 12.

Step 310: Source Position.

The subroutine 300 includes sensing a light source position. The first light sensor 18 determines the position of the third light source 44 relative to the first vehicle and the first windscreen 12. Because the source of the glare—in this example the third light source 44—may vary considerably, the location of the third light source 44 may also vary considerably. The subroutine 300 may only be determining or sensing the direction of the third light source 44. Therefore, the subroutine 300 may not be concerned as to whether the source is 200 yards or 92 million miles away, but is concerned with the direction and intensity of the third light source 44.

Step 312: Eye Position.

The subroutine 300 includes either estimating the eye position 20 of the occupant or sensing the eye position 20 of the occupant. The eye position sensor 22 may determine the actual location of each of the driver's eyes, the general location of the driver's eyes, or of the driver's head (which provides an approximation for the eyes).

Step 314: Calculate Intersecting Region.

The subroutine 300 also includes calculating the intersecting region 24 of the first windscreen ICF 13. The intersecting region 24 is located substantially along a line from the position of the third light source 44 to the (estimated or sensed) eye position 20.

Step 316: Match Intersecting Region to ICF Cells.

Figure 5:
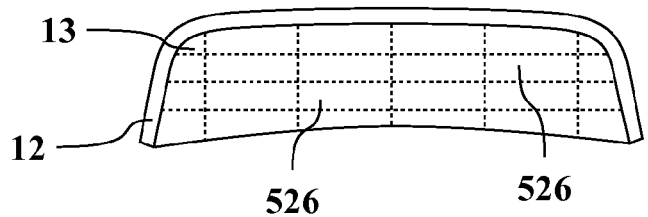
FIG. 5 is a schematic front view of one of the windscreens shown in FIG. 1, shown with a matrix of selectively-darkenable intensity control film (ICF) cells.

As shown in FIG. 5, the first windscreen ICF 13 may be formed from the matrix of selectively-darkenable ICF cells 526. The subroutine 300 includes matching the intersecting region 24 to one or more of the ICF cells 526. The subroutine 300 may select the ICF cell 526 whose center is nearest to the intersecting region 24, or may select a plurality of ICF cells 526 which encompass or surround the intersecting region 24. Therefore, the controller will be configured to determine which ICF cell 526 or plurality of ICF cells 526 are nearest to the intersecting region 24.

Step 318: Activate ICF Cells.

The subroutine 300 then includes darkening the intersecting region 24, such that a reduced amount of light from the third light source 44 passes through the intersecting region 24. If the first windscreen ICF 13 includes the matrix of ICF cells 526, then step 318 would change the plurality of the ICF cells 526 encompassing the intersecting region 24 to become sufficiently opaque to block the glare from the third light source 44 from reaching the driver's eyes. Therefore, the glare is reduced in the intersecting region 24, but the remainder of the first windscreen ICF 13 is substantially transparent and the driver's field of vision is not significantly reduced (the driver would not likely be looking at the bright light emanating from the third light source 44 anyway).

Depending upon the intensity of the third light source 44, the first windscreen ICF 13 may not need to be changed to completely opaque in order to reduce the glare to the driver's eyes. In an alternative configuration, the first windscreen ICF 13 may be capable of increasing the opacity without separately-controllable ICF cells 526. The first windscreen ICF 13 may be composed of a single membrane or film, but still be capable of selectively darkening regions or portions thereof, or the first windscreen ICF 13 may be composed of an infinite number of very small ICF cells 526.

Subroutine 400: Switching System Subroutine.

Generally, the switching system subroutine looks to make the whole first windscreen ICF 13 opaque for short, oscillating periods of time. The subroutine 400 may control both the first windscreen ICF 13 and the first light source ICF 15 between a substantially opaque state and a substantially clear state. On its own, this oscillation reduces to the total passage of light and glare to the eyes of occupants. When combined with a similar system on the second vehicle, the drivers and occupants of both the first vehicle and the second vehicle may be nearly-completely shielded from the glare produced by the oncoming vehicle. Both the first anti-glare system 10 and the second anti-glare system 30 are running the subroutine 400, such that the subroutine may be considered to include both vehicles or to be operating substantially simultaneously, but separately, in both vehicles.

Step 410: Adjustable Schedules?

The method 200 has included sensing the first light source 14 with the second anti-glare system 30 of the second vehicle, and sensing the second light source 34 with the first anti-glare system 10 of the first vehicle, and has already determined that both the first anti-glare system 10 and the second anti-glare system 30 are capable of running the switching system subroutine 400. Decision step 410 determines if the vehicles are both capable of altering the schedules of oscillation for the first windscreen ICF 13 and the second windscreen ICF 33 between the opaque and transparent states. This determination may be made by communication between the first anti-glare system 10 and the second anti-glare system 30 or by the first light sensor 18 and the second light sensor 38.

Step 412: Initiate Fixed Schedule A.

If both the first anti-glare system 10 and the second anti-glare system 30 are not configured to adjust to each other's schedules, the subroutine 400 proceeds to step 412. The first anti-glare system 10 is equipped with its own fixed schedule (a first schedule) and the controller begins oscillating the first light source ICF 15 between the substantially opaque state and the substantially clear state on the first schedule. Step 412 also includes oscillating the first windscreen ICF 13 between the substantially opaque state and the substantially clear state on the first schedule. Therefore, the first anti-glare system 10 is switching between states of blocking both incoming light with the first windscreen ICF 13 and blocking outgoing light with the first light source ICF 15.

Step 414: Initiate Fixed Schedule B.

The second anti-glare system 30 is equipped with its own fixed schedule (a second schedule) and the controller begins oscillating the second light source ICF 35 between the substantially opaque state and the substantially clear state on the second schedule. Step 414 also includes oscillating the second windscreen ICF 33 between the substantially opaque state and the substantially clear state on the second schedule. Therefore, the second anti-glare system 30 is switching between states of blocking both incoming light with the second windscreen ICF 33 and blocking outgoing light with the second light source ICF 35. Both the first and second schedules operate at high frequencies.

Step 416: Harmonic Beat.

The second schedule is different from the first schedule because the first schedule has a first frequency and the second schedule has a second frequency, which is different from the first frequency. Therefore, as the first anti-glare system 10 oscillates at the first schedule and the second anti-glare system 30 oscillates at the second schedule, a harmonic beat occurs between the anti-glare systems of the two vehicles. The drivers of both the first vehicle and the second vehicle may perceive the harmonic beat as a fluctuating or pulsating of the oncoming light source, but both drivers will also be exposed to significantly reduced amounts of glare from the oncoming light source.

Depending upon the configuration of the first anti-glare system 10 and the second anti-glare system 30, the second frequency may be between one to thirty percent different from the first frequency. Reducing the glare to the drivers of the first vehicle and the second vehicle may be especially important in low light conditions, such as night time driving, or when one or both of the first vehicle and the second vehicle has its high beams on.

If both the first anti-glare system 10 and the second anti-glare system 30 are configured to adjust to each other's schedules, the subroutine 400 proceeds to steps 420 and 422. In this situation, the subroutine 400 establishes oscillation schedules for the first anti-glare system 10 and the second anti-glare system 30 which allow the first windscreen ICF 13 to be opaque and blocking glare from the second light source 34 when the second light source ICF 35 is transparent. These schedules operate on a common frequency. As used herein, opaque refers to any level of opacity of the ICF which sufficiently reduces the passage of light through the ICF to benefit vehicle occupants by reducing glare. Depending upon the lighting conditions, this may be only slightly opaque to simply reduce passage of light, or may be nearly blackening the ICF to prevent all light passage.

In order to similarly block glare to both vehicles, the second schedule is one hundred eighty degrees out of phase from the first schedule, such that the first light source ICF 15 is in the substantially opaque state while the second windscreen ICF 33 is in the substantially clear state. Alternatively expressed, the second schedule may be offset by $\pi$ radians from the second schedule.

Steps 420 and 422: Determine Common Frequency.

The first anti-glare system 10 and the second anti-glare system 30 select a common frequency for oscillating between the opaque and the transparent states of the respective ICFs. Therefore, if no harmonic beat will be established and, if the phase lag for each vehicle is correctly established, the first anti-glare system 10 and the second anti-glare system 30 will operate in concert to reduce glare to and from the other, oncoming vehicle.

Steps 424 and 426: Sense Angle to Magnetic North.

Figure 6:
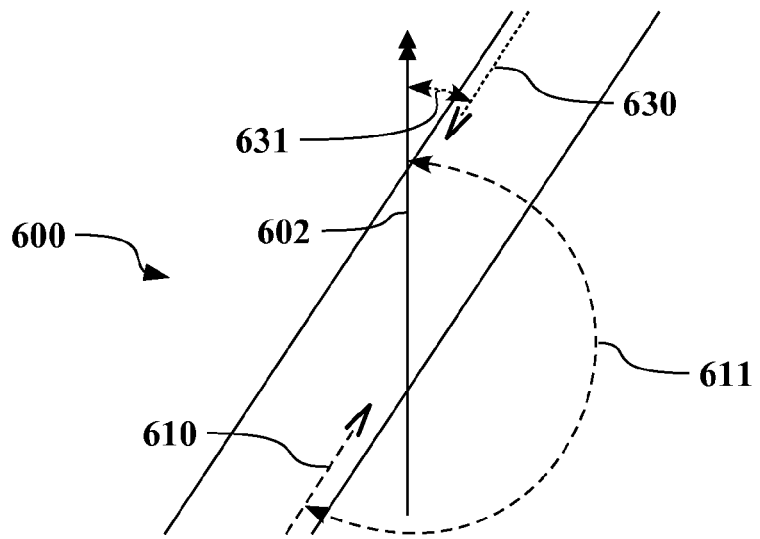
FIG. 6 is a schematic diagram showing the directions of travel of two vehicles relative to magnetic north (upward, as viewed in FIG. 6)

One mechanism for correctly establishing the phase lag is for both the first anti-glare system 10 and the second anti-glare system 30 to be sensing magnetic north. Referring to FIG. 6, and with continued reference to FIGS. 1-5, there is shown a diagram 600 showing the direction of travel of the first vehicle and the second vehicle relative to magnetic north, which is illustrated by a double arrow 602.

An arrow 610 shows the direction of travel of the first vehicle and an arrow 630 shows the direction of travel of the second vehicle. The first anti-glare system 10 determines a first offset angle 611 relative to magnetic north, and the second anti-glare system 30 determines a second offset angle 631 relative to magnetic north. As shown, the second offset angle 631 is approximately 180 degrees rotated from the first offset angle 611. The subroutine 400 includes calculating the first schedule as a function of the first offset angle 611 and calculating the second schedule as a function of the second offset angle 631.

Alternatively, when the vehicles are equipped with GPS devices, the vehicles may sense geographic north and calculate the offset angle relative to geographic north instead of magnetic north. The first vehicle and the second vehicle may not always be traveling exactly 180 degrees (head on) relative to each other. However, this will often be the case, and when one or both of the vehicles is rounding a corner, the offset angles will become closer to 180 degrees as the glare from the oncoming light sources becomes more intense.

Steps 428 and 430: Phase Lag from Common Clock.

The subroutine 400 may also include monitoring a common clock cycle, such that calculating the first schedule includes phase lagging the first offset angle 611 from the common clock cycle, and calculating the second schedule includes phase lagging the second offset angle 631 from the common clock cycle. The common clock cycle provides a constant reference point for beginning the schedules for the first anti-glare system 10 and the second anti-glare system 30, respectively. Therefore, the first anti-glare system 10 and the second anti-glare system 30 have a common reference to allow scheduling ICF oscillations which allow the second light source ICF 35 to be projecting light only while the first windscreen ICF 13 is blocking light, and the first light source ICF 15 to be projecting light only while the second windscreen ICF 33 is blocking light.

Steps 432 and 434: Initiate First Schedule and Second Schedule.

Figure 7:
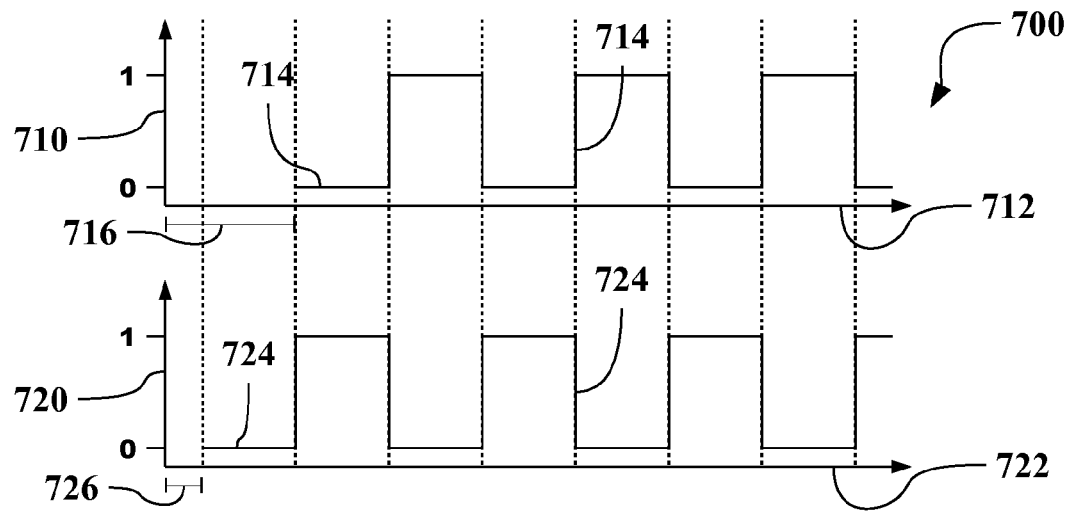
FIG. 7 is a schematic chart showing the oscillating schedules for controlling the ICF of each of the two vehicles shown in FIG. 6.

Referring to FIG. 7, and with continued reference to FIGS. 1-6, there is shown a schematic chart 700 illustrating the oscillating schedules for controlling the ICFs on each of the first anti-glare system 10 and the second anti-glare system 30, as calculated relative to magnetic north in FIG. 6. A y-axis 710 represents the control state for the first windscreen ICF 13 and the first light source ICF 15. When the control state is 1, the first windscreen ICF 13 and the first light source ICF 15 are active and opaque, such that a reduced amount of light passes through. Similarly, when the control state is 0, the first windscreen ICF 13 and the first light source ICF 15 are inactive and transparent, such that most light passes through.

An x-axis 712 represents the passage of time for the first anti-glare system 10 relative to the common clock cycle. Each dashed line division along the x-axis 712 represents one half cycle of the frequency, which may be equal to 180 degrees or $\pi$ radians. A line 714 shows the first schedule for the first windscreen ICF 13 and the first light source ICF 15. A first phase lag 716 is calculated from the first offset angle 611, and either delays or adjusts the first schedule by the first offset angle 611.

Similarly, a y-axis 720 represents the control state for the second windscreen ICF 33 and the second light source ICF 35, and an x-axis 722 represents the passage of time for the second anti-glare system 30 relative to the common clock cycle. A line 724 shows the second schedule for the second windscreen ICF 33 and the second light source ICF 35. A second phase lag 726 is calculated from the second offset angle 631, and either delays or adjusts the second schedule by the second offset angle 631.

Steps 436 and 438: Near Complete Reduction in Glare.

As shown in FIG. 7, because the first offset angle 611 is 180 degrees from the second offset angle 631, the first phase lag 716 adjusts the first schedule (shown as line 714) to be approximately 180 degrees different from the second schedule (shown as line 724). Therefore, the first schedule is oscillating the first windscreen ICF 13 between the substantially opaque state and the substantially clear state while the second schedule 724 is oscillating the second light source ICF 35 between the substantially clear state and the substantially opaque state on the second schedule 724. The first windscreen ICF 13 is in the substantially opaque state during periods when the second light source ICF 35 is in the substantially clear state. To the driver of the first vehicle, the second light source 34 will be seen as a very low-intensity source, and to the driver of the second vehicle, the first light source 14 will be seen as a very low-intensity source.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method for reducing glare between a first vehicle and a second vehicle, wherein the first vehicle has a first light source with a first light source intensity control film (ICF) and a first windscreen with a first windscreen ICF, and the second vehicle has a second light source with a second light source ICF and a second windscreen with a second windscreen ICF, the method comprising:
    sensing the first light source with the second vehicle, and sensing the second light source with the first vehicle;
    oscillating the first light source ICF between a substantially opaque state and a substantially clear state on a first schedule;
    oscillating the second windscreen ICF between the substantially opaque state and the substantially clear state on a second schedule different from the first schedule;
    sensing magnetic north;
    determining a first offset angle for the first vehicle relative to magnetic north;
    determining a second offset angle for the second vehicle relative to magnetic north;
    calculating the first schedule as a function of the first offset angle; and
    calculating the second schedule as a function of the second offset angle.

2. The method of claim 1, wherein the second schedule is one hundred eighty degrees out of phase from the first schedule, such that the first light source ICF is in the substantially opaque state while the second windscreen ICF is in the substantially clear state.

3. The method of claim 1, further comprising:
    oscillating the first windscreen ICF between the substantially opaque state and the substantially clear state on the first schedule; and
    oscillating the second light source ICF on the second schedule, such that the first windscreen ICF is in the substantially opaque state while the second light source ICF is in the substantially clear state.

4. The method of claim 1, further comprising:
    monitoring a common clock cycle;
    wherein calculating the first schedule includes phase lagging the first offset angle from the common clock cycle; and
    wherein calculating the second schedule includes phase lagging the second offset angle from the common clock cycle.

5. The method of claim 1,
    wherein the first schedule has a first frequency and the second schedule has a second frequency different from the first frequency; and
    wherein the second frequency is between one to thirty percent different from the first frequency.

6. A method for reducing glare between a first vehicle and a second vehicle, wherein the first vehicle has a first light source with a first light source intensity control film (ICF) and a first windscreen with a first windscreen ICF, and the second vehicle has a second light source with a second light source ICF and a second windscreen with a second windscreen ICF, the method comprising:
    sensing the first light source with the second vehicle, and sensing the second light source with the first vehicle;
    oscillating the first light source ICF between a substantially opaque state and a substantially clear state on a first schedule;
    oscillating the second windscreen ICF between the substantially opaque state and the substantially clear state on a second schedule different from the first schedule, wherein the second schedule is one hundred eighty degrees out of phase from the first schedule, such that the first light source ICF is in the substantially opaque state while the second windscreen ICF is in the substantially clear state;
    oscillating the first windscreen ICF between the substantially opaque state and the substantially clear state on the first schedule;
    oscillating the second light source ICF on the second schedule, such that the first windscreen ICF is in the substantially opaque state while the second light source ICF is in the substantially clear state;
    sensing magnetic north;
    determining a first offset angle for the first vehicle relative to magnetic north;
    determining a second offset angle for the second vehicle relative to magnetic north;
    calculating the first schedule as a function of the first offset angle; and
    calculating the second schedule as a function of the second offset angle.

7. The method of claim 6, further comprising:
    monitoring a common clock cycle;
    wherein calculating the first schedule includes phase lagging the first offset angle from the common clock cycle; and
    wherein calculating the second schedule includes phase lagging the second offset angle from the common clock cycle.

\* \* \* \* \*